United States Patent
Dudley

[19]

[11] Patent Number: 5,870,946
[45] Date of Patent: Feb. 16, 1999

[54] ROASTING TOTE RACK

[76] Inventor: Debra Dudley, P. O. Box 40, 749 Priceville Rd., Bonnieville, Ky. 42713

[21] Appl. No.: 986,774

[22] Filed: Dec. 8, 1997

[51] Int. Cl.[6] .............................. A47J 27/00; A47J 37/04; A47J 37/12; A47J 43/00

[52] U.S. Cl. ................................ 99/426; 99/400; 99/446; 99/450

[58] Field of Search .............................. 99/400, 401, 426, 99/427, 444–446, 449, 450, 413, 425; 248/174; 249/119, 120; 211/14, 60.1, 13.1; 126/348; D7/355, 359, 409; 220/409, 428

[56] References Cited

U.S. PATENT DOCUMENTS

| | | | |
|---|---|---|---|
| 303,598 | 8/1884 | Tuttle | 99/450 |
| 2,565,046 | 8/1951 | Rooth | 99/426 X |
| 3,199,438 | 8/1965 | Myler et al. | 99/450 X |
| 4,291,616 | 9/1981 | Taylor | 99/446 |
| 4,941,401 | 7/1990 | Sarnoff et al. | 99/413 X |
| 5,628,245 | 5/1997 | Baze | 99/425 X |

*Primary Examiner*—Timothy F. Simone
*Attorney, Agent, or Firm*—Michael I. Kroll

[57] ABSTRACT

A roasting tote rack (10) comprising a one piece perforated frame unit (12) to hold meat (14) which fits into a baking pan (16), so that the meat (14) can be roasted in an oven (18) of a stove (20). A structure (22) is formed into the one piece perforated frame unit (12) for transporting in a convenient manner the meat (14) in the one piece perforated frame unit (12) out of the baking pan (16) from the oven (18) in the stove (20) to a platter on a table after the meat (14) has been roasted.

14 Claims, 2 Drawing Sheets

5,870,946

ROASTING TOTE RACK

BACKGROUND OF THE INVENTION

1. Field of the Invention

The instant invention relates generally to cooking utensils and more specifically it relates to a roasting tote rack. The roasting tote rack is a sturdy one piece perforated frame unit having foot runners to hold meat up and out of grease drippings in a baking pan, while baking. The handle portions make it convenient to transport the meat from an oven in a stove to a platter on a table. A quality porcelain coating thereon, makes the roasting tote rack dishwasher safe for easy cleaning.

2. Description of the Prior Art

Numerous cooking utensils have been provided in prior art that are adapted to assist people in preparing foods by heat or fire for eating. While these units may be suitable for the particular purpose to which they address, they would not be as suitable for the purposes of the present invention as heretofore described.

SUMMARY OF THE INVENTION

A primary object of the present invention is to provide a roasting tote rack that will overcome the shortcomings of the prior art devices.

Another object is to provide a roasting tote rack, that consists of a sturdy one piece perforated frame unit having foot runners to hold meat up and out of grease drippings in a baking pan while baking.

An additional object is to provide a roasting tote rack, in which its handle portions make it convenient to transport the meat from an oven in a stove to a platter on a table.

A still additional object is to provide a roasting tote rack that contains a quality porcelain coating thereon, which makes the roasting tote rack dishwasher safe for easy cleaning.

A further object is to provide a roasting tote rack that is simple and easy to use.

A still further object is to provide a roasting tote rack that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein.

Similar reference characters denote corresponding features consistently throughout the attached drawings.

DETAILED DESCRIPTION OF THE PREFERRED EMBODIMENTS

Figure 1:
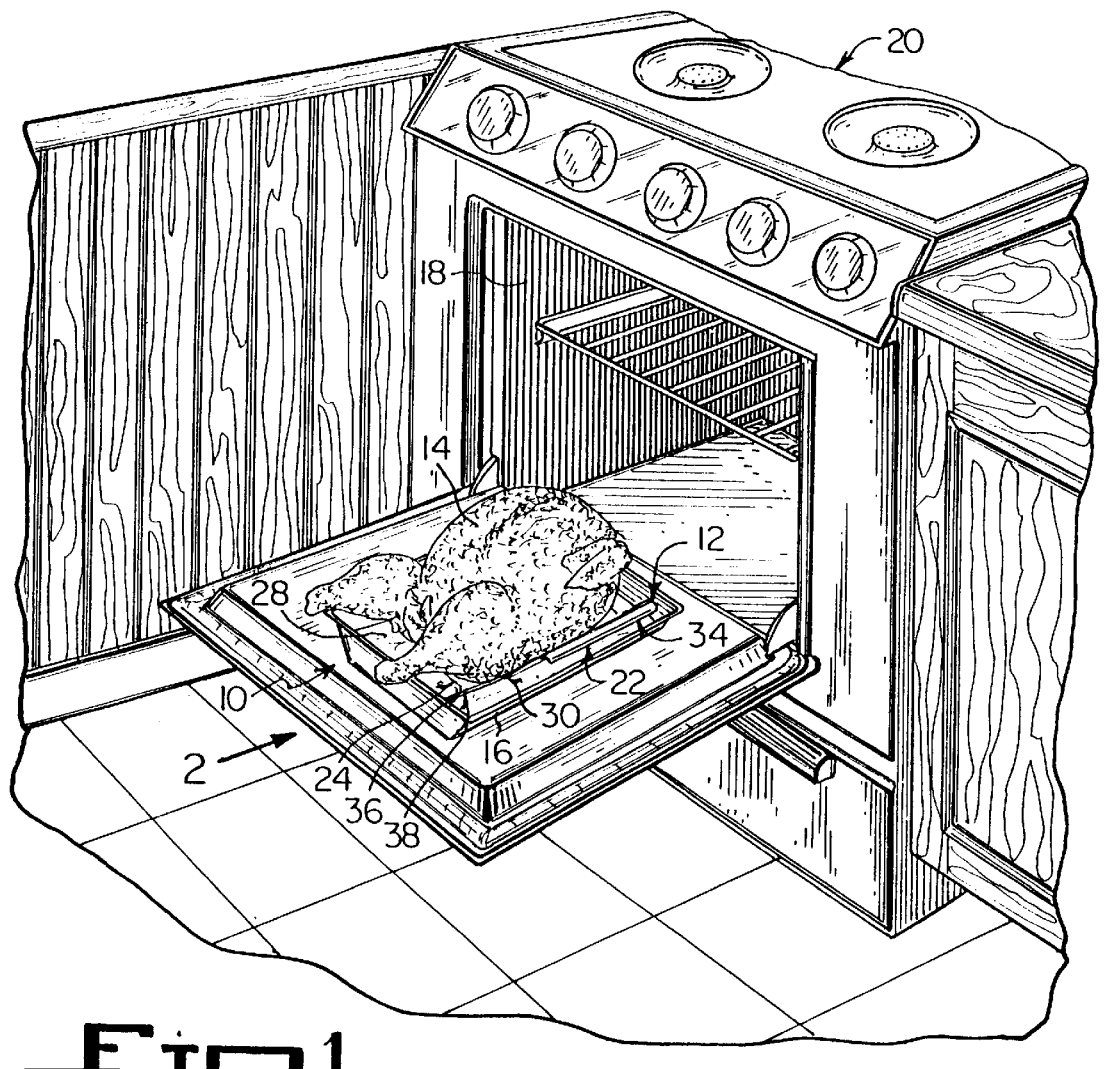
FIG. 1 is a perspective view of the present invention in a baking pan supporting a turkey on an open oven door of a stove.
Figure 2:
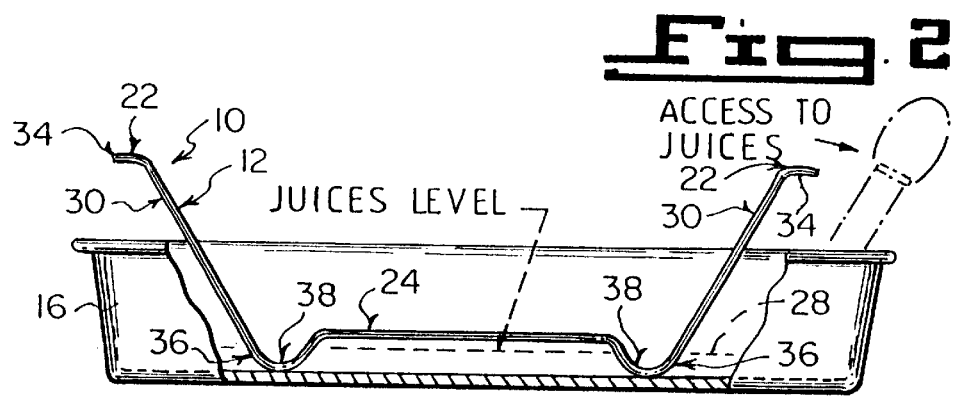
FIG. 2 is an enlarged elevational view taken in the direction of arrow 2 in FIG. 1, of the baking pan per se broken away to show the present invention therein.
Figure 3:
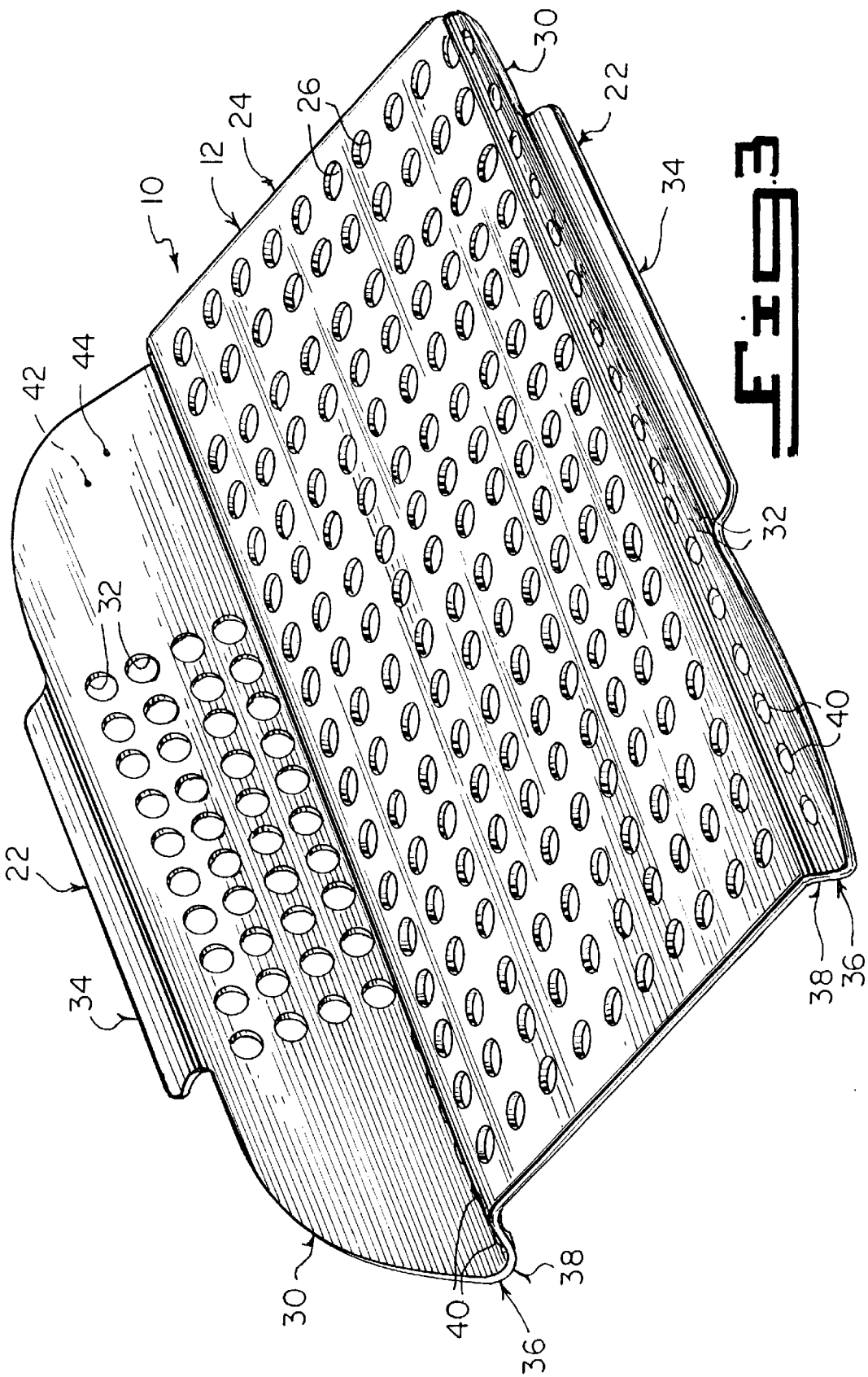
FIG. 3 is a further enlarged perspective view of the instant invention per se.

Turning now descriptively to the drawings, in which similar reference characters denote similar elements throughout the several views, FIGS. 1 through 3 illustrate the present invention being a roasting tote rack 10. With regard to the reference numerals used, the following numbering is used throughout the various drawing figures.

10 roasting tote rack
12 one piece perforated frame unit of 10
14 meat in 12
16 baking pan
18 oven of 20
20 stove
22 transporting structure of 10 in 12
24 horizontal base portion of 12
26 small hole in 24
28 grease drippings and juices
30 side portion of 12
32 small hole in 30
34 handle portion of 22
36 elevating facility of 10
38 U-shaped foot runner of 36
40 small hole in 38
42 strong durable material (steel) of 10
44 heat resistant material (porcelain) on 10 roasting tote rack 10 comprises a one piece perforated frame unit 12 to hold meat 14 which fits into a baking pane 16, so that the meat 14 can be roasted in an oven 18 of a stove 20. A structure 22 is formed into the one piece perforated frame unit 12, for transporting in a convenient manner, the meat 14 in the one piece perforated frame unit 12 out of the baking pan 16 from the oven 18 in the stove 20 to a platter on a table, after the meat 14 has been roasted.

The one piece perforated frame unit 12 includes a horizontal base portion 24, having a plurality of small holes 26 therethrough to support the meat 14 placed thereon. The small holes 26 will allow grease drippings and juices 28 to go directly into the baking pan 16.

The one piece perforated frame unit 12 further contains a pair of side portions 30. Each side portion 30 has a plurality of small holes 32 therethrough. Each side portion 30 extends upwardly and at an angle outwardly from one side of the horizontal base portion 24. The small holes 32 will allow the grease drippings and juices 28 to go directly into the baking pan 16.

The transporting structure 22 consists of a pair of handle portions 34. Each handle portion 34 extends outwardly and horizontally from one side portion 30, so that a person can safely grasp the handle portions 34 to lift the one piece perforated frame unit 12.

A facility 36 is formed into the one piece perforated frame unit 12, for elevating the meat 14 in the one piece perforated frame unit 12 above the grease drippings and juices 28 in the baking pan 16 coming from the roasting meat 14. The elevating facility 36 includes a pair of U-shaped foot runners 38. Each U-shaped foot runner 38 has a plurality of small holes 40 therethrough. Each U-shaped foot runner 38 extends lengthwise between one side portion 30 and the horizontal base portion 34. The small holes 40 will allow the grease drippings and juices 28 to go directly into the baking pan 16.

The roasting tote rack 10 is fabricated out of a strong durable material 42. The strong durable material 42 is steel. The roasting tote rack 10 is coated with a heat resistant material 44. The heat resistant material 44 is quality long lasting porcelain making the roasting tote rack 10 dishwasher safe for easy cleaning. The heat 14 can consist of a turkey (as shown in FIG. 1), a chicken, a roast beef, a ham or any other kind of roasting meat.

OPERATION OF THE INVENTION

To use the roasting tote rack 10, the following steps should be taken:

1. Put the meat 14 into the roasting tote rack 10.
2. Grasp the handle portions 34 of the roasting tote rack 10 with the meat 14 and place it into the baking pan 16.
3. Insert the baking pan 16 with the roasting tote rack 10 and the meat 14 into the oven 18 of the stove 20.
4. Allow the meat 14 to totally roast, in which the grease drippings and juices 28 will go directly into the baking pan 16.
5. Grasp the handle portions 34 of the roasting tote rack 10 again with pot holders or safety gloves.
6. Lift the roasting tote rack 10 with the roasted meat 14 out of the baking pan 16.
7. Slide the roasted meat 14 from the roasting tote rack 10 onto a platter on a table.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A roasting tote rack comprising:
    a) a one piece perforated frame unit to hold meat which fits into a baking pan, so that the meat can be roasted in an oven of a stove, including:
        i) a horizontal base portion having a plurality of small holes therethrough to support the meat placed thereon, while said small holes will allow grease drippings and juices to go directly into the baking pan; and
        ii) a pair of side portions, each said side portion having a plurality of small holes therethrough, whereby each said side portion extends upwardly and at an angle outwardly from one side of said horizontal base portion, while said small holes allow the grease drippings and juices to go directly into the baking pan; and
    b) means formed into said one piece perforated frame unit for transporting in a convenient manner the meat in said one piece perforated frame unit out of the baking pan from the oven in the stove to a platter on a table after the meat has been roasted.

2. A roasting tote rack as recited in claim 1, wherein said transporting means includes a pair of handle portions, whereby each said handle portion extends outwardly and horizontally from one said side portion, so that a person can safely grasp said handle portions to lift said one piece perforated frame unit.

3. A roasting tote rack as recited in claim 2, further including means formed into said one piece perforated frame unit for elevating the meat in said one piece perforated frame unit above the grease drippings and juices in the baking pan coming from the roasting meat.

4. A roasting tote rack as recited in claim 3, wherein said elevating means includes a pair of U-shaped foot runners, each said U-shaped foot runner having a plurality of small holes therethrough, whereby each U-shaped foot runner extends lengthwise between one said side portion and said horizontal base portion, while said small holes will allow the grease drippings and juices to go directly into the baking pan.

5. A roasting tote rack as recited in claim 4, wherein said roasting tote rack is fabricated out of a strong durable material.

6. A roasting tote rack as recited in claim 5, wherein said strong durable material is steel.

7. A roasting tote rack as recited in claim 6, wherein said roasting tote rack is coated with a heat resistant material.

8. A roasting tote rack as recited in claim 7, wherein said heat resistant material is quality long lasting porcelain making said roasting tote rack dishwasher safe for easy cleaning.

9. A roasting tote rack as recited in claim 1, further including means formed into said one piece perforated frame unit for elevating the meat in said one piece perforated frame unit above the grease drippings and juices in the baking pan coming from the roasting meat.

10. A roasting tote rack as recited in claim 9, wherein said elevating means includes a pair of U-shaped foot runners, each said U-shaped foot runner having a plurality of small holes therethrough, whereby each U-shaped foot runner extends lengthwise between one said side portion and said horizontal base portion, while said small holes will allow the grease drippings and juices to go directly into the baking pan.

11. A roasting tote rack as recited in claim 1, wherein said roasting tote rack is fabricated out of a strong durable material.

12. A roasting tote rack as recited in claim 11, wherein said strong durable material is steel.

13. A roasting tote rack as recited in claim 1, wherein said roasting tote rack is coated with a heat resistant material.

14. A roasting tote rack as recited in claim 13, wherein said heat resistant material is quality long lasting porcelain making said roasting tote rack dishwasher safe for easy cleaning.

* * * * *